July 25, 1933.  E. G. MUNZ  1,919,247
ROTARY SPRINKLER
Filed Dec. 21, 1931
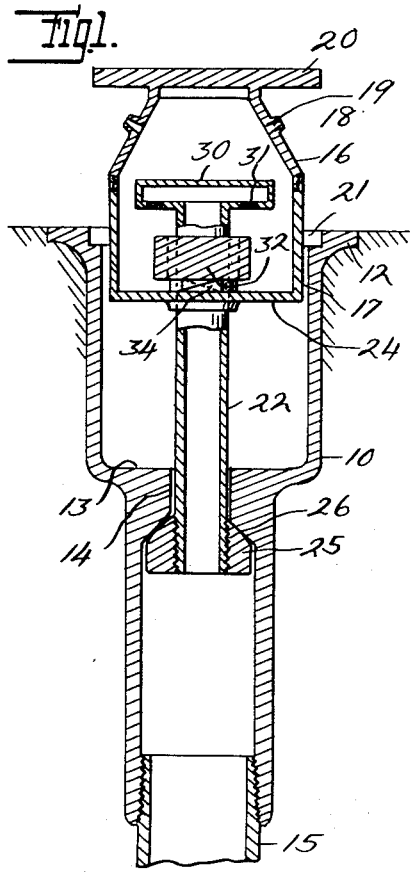
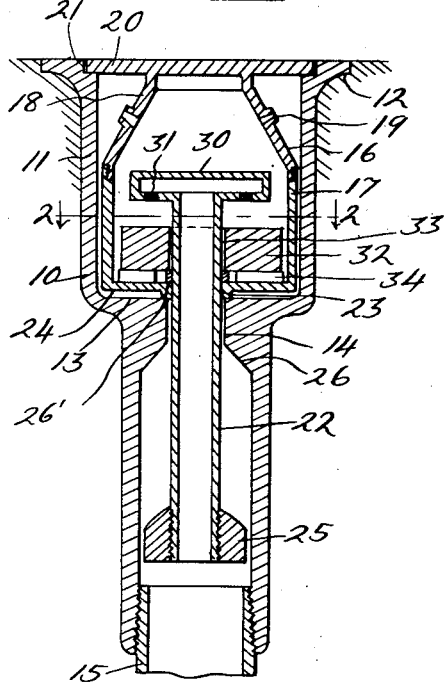
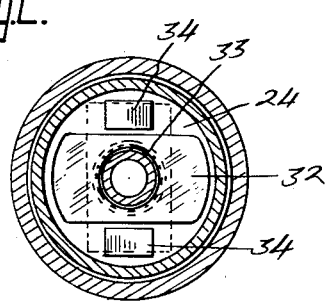
INVENTOR
Elmer G. Munz
BY
Whitemore Hulbert Whitemore Belknap
ATTORNEYS Patented July 25, 1933

1,919,247

UNITED STATES PATENT OFFICE

ELMER G. MUNZ, OF DETROIT, MICHIGAN

ROTARY SPRINKLER

Application filed December 21, 1931. Serial No. 582,460.

This invention relates generally to irrigating apparatus and refers more particularly to sprinkling devices designed for distributing water over relatively large areas.

One of the principal objects of this invention consists in the provision of a sprinkler having a rotary distributing head, together with means associated with the head and operated by the water discharged into the latter for periodically exerting rotative impulses to the head in such a manner as to rotate the same at a relatively slow rate of speed irrespective of the velocity or quantity of water issuing from the head or the pressure of the water. By rotating the distributor head as specified above, any tendency of the water streams issuing from the head to become bent due to rapid changes in the positions of the nozzles will be practically eliminated, with the result that maximum areas may be irrigated by the sprinkler.

Another advantageous feature of the present invention is to provide a sprinkler with a distributing head which, in addition to being periodically rotated by the water, is also movable axially under the influence of the water pressure from a position flush with the ground to a position spaced substantially above the same.

A further object of the present invention consists in the provision of a sprinkler wherein the resistance offered to the rotation of the distributing head by the water is reduced to the minimum.

A still further object of the invention consists in the provision of a sprinkler possessing the foregoing advantageous features which is extremely simple in construction and capable of being inexpensively manufactured, assembled and installed.

The foregoing as well as other objects will be made more apparent as this description proceeds, especially when considered in connection with the accompanying drawing, wherein:

Figure 1 is a central longitudinal sectional view through a sprinkler unit constructed in accordance with the present invention;

Figure 2 is a sectional view taken substantially on the line 2—2 of Figure 3;

Figure 3 is a view similar to Figure 1 showing the various parts of the sprinkler in a different position.

The sprinkler shown herein for the purpose of illustration comprises a housing 10 embedded within the ground and having a tubular portion 11 terminating at the upper end thereof in a laterally outwardly extending flange 12 normally arranged flush with the top surface of the ground. The tubular portion 11 is provided with a bottom wall 13 having a restricted opening 14 therethrough communicating with a supply conduit 15 extending from a source of water under pressure.

Mounted within the housing for axial movement from a position within the tubular portion 11 flush with the top surface of the ground to a position substantially above the aforesaid surface is a water distributing head 16. The distributing head 16 is in the form of a casing having annular side wall portions 17 terminating at the upper ends thereof in a frusto conical wall portion 18 having a pair of nozzles 19 secured thereto at diametrically opposite sides thereof. The casing is further provided with a top wall section 20 havng the marginal edges thereof extending laterally beyond the side walls of the casing for engagement within an annular recess 21 formed in the upper surface of the housing and surrounding the opening in the latter through which the head extends. As will be observed from Figure 3, the arrangement is such that when the distributing head is located within the tubular portion 11 of the housing, the marginal portions of the top wall 20 assume a position within the recess 21 flush with the upper surface of the flange 12 and are supported in this latter position by the annular shoulders formed by the recess.

In order to prevent disengagement of the distributing head from the housing, I provide a nonrotatable tubular stem 22 slidably engaging an opening 23 formed in the bottom wall 24 of the distributing head and also slidably engaging within the opening 14 formed in the lower wall of the tubular portion 11. The lower end of the stem is provided with an enlargement in the form of a nut 25 adapted to engage an annular seat 26 surrounding the opening 14 when the distributing head is in the position shown in Figure 1 for restricting upward movement of the head relative to the housing and for preventing water from escaping past the stem. The upper portion of the stem projects into the housing and is provided with a bearing ring 26' extending laterally outwardly therefrom for engaging the inner surface of the wall 24 surrounding the opening 23 therethrough. The arrangement is such that the bearing 26' serves to limit upward movement of the head 16 relative to the stem and in addition, cooperates with the nut 25 for maintaining the stem in assembled relation with both the head and housng. The upper end of the stem 22 is provided with a substantially flat chamber 30 having portions extending laterally outwardly from opposite sides of the stem and provided with jets 31 in the lower walls thereof issuing tangentially for reasons about to be described.

As previously stated, it is one of the objects of the present invention to periodically rotate the distributing head at a relatively slow rate of speed and for accomplishing this result, I provide an impeller 32 located within the head adjacent the bottom wall 24 thereof and having a centrally arranged opening 33 therein for receiving the portions of the stem 22 below the chamber 30. The internal diameter of the opening 33 is preferably substantially greater than the external diameter of the tubular stem so as to reduce friction to a minimum. Cooperating with the impeller 32 for establishing a driving connection between the same and distributing head is a pair of driving lugs 34 formed upon and extending upwardly from the bottom wall 24 of the head. The driving lugs 34 are arranged upon diametrically opposite sides of the axis of the head in concentric relation thereto and are adapted to be engaged by the free end portions of the impeller 32 upon rotation of the latter. The surfaces of the lugs adapted to be engaged by the impeller are gradually inclined in the direction of rotation of the latter from a point flush with the bottom wall of the casing to a point positioned above the same so as to permit the impeller to gradually ride over the lugs during rotation of the same. It will be apparent, however, that since the lugs 34 are carried by the distributing head upon diametrically opposite sides of the axes thereof and in view of the fact that the head is mounted upon the stem 22 for rotation relative to the impeller, the latter in riding over the inclined surfaces of the lugs will exert driving impulses of equal magnitude upon the distributing head at diametrically opposite sides of the axis thereof for rotating the same a predetermined distance depending upon the width of the inclined surfaces of the lugs. The arrangement is such that during each revolution of the impeller, the distributing head is gradually advanced the predetermined distance aforesaid.

Referring now to the operation of the sprinkler as hereinbefore described and assuming that the parts thereof are in their inoperative position shown in Figure 3, it will be noted that as soon as the water under pressure is released from the source of supply, the same will immediately flow into the lower portion of the housing against the nut 25 and the bottom wall 24 of the distributing head. The discharge of fluid under pressure against the distributing head and nut on the stem causes the said parts to move to their operative positions shown in Figure 1 wherein the distributing head is in engagement with the bearing 26' and the peripheral portions of the nut 25 are in engagement with the annular seat 26 surrounding the opening 14. Upon sealing engagement of the nut 25 with the seat 26, the water under pressure flows through the stem 22 into the chamber 30 whereupon it is discharged through the jets 31 and owing to the inclination of the latter is impinged tangentially upon the upper surface of the impeller 32. The reaction of the water on the impeller 32 causes the latter to rotate relative to the stem and head until the end portions thereof engage the inclined surfaces of the driving lugs 34. As previously stated, upon engagement of the impeller with the inclined surfaces aforesaid, the impeller tends to ride over the inclined surfaces, and in so doing gradually advances the distributing head a predetermined angular distance. It will be apparent that the pressure of the water on the impeller will gradually carry the same beyond the driving lugs with the result that the impeller will continue to rotate freely relative to the distributing head until it again engages the lugs whereupon the distributing head is advanced another step. It will further be apparent that after the water has been discharged upon the impeller, the same builds up a pressure within the distributing head and is immediately issued from the head through the nozzles 19. The water is issued from the nozzles in relatively straight streams changing in direction only during the intervals of movement of the distributing head and since movement of the head is accomplished gradually as previously stated, the length of the stream will not be appreciably effected thereby, with the result that the maximum area is irrigated.

It has also been hereinbefore stated that the invention contemplates a sprinkler wherein the minimum resistance is offered to the rotation of the head. In this connection, it is to be noted that as the impeller rides over the inclined surfaces of the lugs, it exerts a downward pressure on the distributing head causing the same to slide downwardly slightly upon the stem 22 and in so doing relieves the frictional bearing engagement between the end wall 24 of the head and bearing 26' therefor. In other words, during the intervals of rotation of the distributing head, the bottom wall 24 thereof is in spaced relation to the bearing 26', with the result that the frictional resistance offered to the rotation of the head by the bearing is eliminated.

What I claim as my invention is:

1. In a sprinkler, a rotatable distributing head having a nozzle, an impeller mounted within said head for rotation relative to the latter, means for discharging water into said head against the impeller in a direction to exert a torque on the latter about the axis of the same, and means operable upon rotation of the impeller to simultaneously exert driving impact impulses on said head on opposite sides of the axis thereof.

2. In a sprinkler, a rotatable distributing head having a nozzle, an impeller mounted within said head for rotation relative to the latter, means above said impeller for discharging water into said head against the impeller in a direction to exert a torque on the latter about the axis of the same, and means operable upon rotation of the impeller to exert driving impact impulses on said head.

3. In a sprinkler, a rotatable distributing head having a bottom wall and having a nozzle, an impeller mounted within the head for rotation relative thereto, means for discharging water into the head against the upper surface of the impeller in a direction to both urge the impeller downwardly toward the bottom wall of the head and to exert a torque on the impeller about the axis of rotation thereof for continuously rotating the same, and means projecting upwardly from the bottom wall of the head for intermittently receiving an impact from said impeller whereby said head is periodically rotated.

4. In a sprinkler, a rotatable distributing head having a bottom wall and having a nozzle, an impeller mounted within the head for rotation relative thereto, means for discharging water into the head against the upper surface of the impeller in a direction to both urge the impeller downwardly toward the bottom wall of the head and to exert a torque on the impeller about the axis of rotation thereof for continuously rotating the same, and a projection on the bottom wall of the head having an upwardly extending surface inclined in the direction of rotation of the impeller for periodic engagement by the latter whereby the head is gradually and intermittently rotated by the impeller.

5. In a sprinkler, a rotatable distributing head having a nozzle, an impeller mounted within said head for rotation relative to the latter, means for discharging water into said head against the impeller in a direction to exert a torque on the latter about the axis of the same, and projections united to the head and located on diametrically opposite sides of the axis of rotation thereof for simultaneously receiving an impact from said impeller during each revolution of the latter.

6. In a sprinkler, a rotatable distributing head having a nozzle, an impeller mounted within said head for rotation relative to the latter, means for discharging water into said head against the impeller in a direction to exert a torque on the latter about the axis of the same, and a projection united to the head below said impeller for receiving an impact from said impeller during each revolution of the latter.

7. In a sprinkler, a rotatable distributing head having a bottom wall and having a nozzle, an impeller mounted within the head for rotation relative thereto, means for discharging water into the head against the upper surface of the impeller in a direction to both urge the impeller downwardly toward the bottom wall of the head and to exert a torque on the impeller about the axis of rotation thereof for continuously rotating the same, and a plurality of upwardly extending projections on diametrically opposite sides of the axis of rotation of the head and having surfaces inclined upwardly in the direction of rotation of the impeller for simultaneously engaging the latter.

8. In a sprinkler, the combination with a tubular stem adapted to be connected to a source of water under pressure, of a distributing head slidably and rotatably mounted upon said stem and having a bottom wall formed with an upwardly extending projection spaced radially outwardly from the axis of rotation of the head, an annular shoulder on said stem within the head normally forming a bearing for the latter and restricting upward movement of the same relative to the stem, an impeller located within the head and rotatable about the axis of the stem for periodically engaging the projection aforesaid to rotate the head intermittently, means associated with the stem for discharging the water flowing therethrough against the upper surface of the impeller in a direction to exert a torque on the impeller for continuously rotating the same and also operable to exert a downward pressure upon the impeller for moving the head axially downwardly on the stem to relieve the friction between the head and bearing aforesaid when the projection is engaged by the impeller.

ELMER G. MUNZ.